United States Patent [19]

Hayes

[11] 4,103,216
[45] Jul. 25, 1978

[54] STEPPING MOTOR CLOSED LOOP CONSTANT VELOCITY CONTROL SYSTEM

[75] Inventor: Carlos F. Hayes, Redmond, Wash.

[73] Assignee: Tally Corporation, Kent, Wash.

[21] Appl. No.: 690,900

[22] Filed: May 28, 1976

[51] Int. Cl.² .............................................. G05B 19/40
[52] U.S. Cl. .................................... 318/685; 318/254
[58] Field of Search ............... 318/685, 696, 138, 254, 318/561, 314, 318

[56] References Cited

U.S. PATENT DOCUMENTS

| | | | |
|---|---|---|---|
| 3,646,417 | 2/1972 | Cassie et al. | 318/318 |
| 3,766,458 | 10/1973 | Nishimura et al. | 318/313 |
| 3,813,592 | 5/1974 | Ryberg | 318/696 |
| 3,863,118 | 1/1975 | Lander et al. | 318/685 |
| 3,990,014 | 11/1976 | Hakozaki | 318/696 X |

*Primary Examiner*—Robert K. Schaefer
*Assistant Examiner*—John J. Feldhaus

*Attorney, Agent, or Firm*—Christensen, O'Connor, Johnson & Kindness

[57] ABSTRACT

A closed loop control system for controlling the rotational velocity of a stepping motor during a period of continuous shaft rotation such that the velocity remains constant is disclosed. Step response signals are developed for each step increment of movement of the shaft of the stepping motor. The step response signals are used to control the counting of clock pulses by a counter, resulting in the production of measured inter-step time ($T_t$) data. The $T_t$ data is gated to a controller functioning in accordance with the equation $[2D_{t-1} + (T_{nom} - T_t)]/2$, to produce step delay control ($D_t$) data, where $D_{t-1}$ data is the step delay control data for the previous step and $T_{nom}$ data is predetermined nominal inter-step time data. Each newly developed $D_t$ data is used to preset a counter that controls the production of the next motor stepping control pulse, and becomes $D_{t-1}$ for the next calculation. Separate $D_t$ data is developed for both the clockwise and counter-clockwise directions of rotation of the stepping motor shaft.

12 Claims, 4 Drawing Figures

STEPPING MOTOR CLOSED LOOP CONSTANT VELOCITY CONTROL SYSTEM

BACKGROUND OF THE INVENTION

This invention is directed to control systems, and, more particularly, to closed loop control systems for controlling the operation of a stepping motor.

The present invention was developed for use in combination with a serial printer and is described in such an environment. However, as will be appreciated by those skilled in the stepping motor art, and others, the invention is useful in other environments wherein stepping motors are utilized to move, or control the position of a mechanical device or devices.

As used herein the term serial printer refers to a printer wherein a print head is skewed or moved, either uni-directionally or bi-directionally across a print receiving medium (paper), during a printing operation. The print head may cause an integral character to be formed each time the head is moved into contact with the print receiving medium (either directly or via a print ribbon), or only a portion of a character, as occurs in a dot matrix type serial printer.

One of the problems relating to the use of stepping motors to move a mechanical object, such as a serial printer print head, is maintaining the velocity of movement of the object precisely constant. That is, as will be readily understood by those skilled in the stepping motor art, the application of a series of motor step pulses to a stepping motor causes the motor's shaft to accelerate to a velocity related to the frequency of the pulses. The motor shaft continues to rotate at a constant average velocity as long as the frequency of the motor step pulses remains constant. If the frequency varies, the velocity of movement of the motor shaft will vary in a corresponding manner. The problem occurs because, while the average velocity is maintained constant, the instantaneous velocity will vary slightly and overshoot and undershoot the average velocity due to a variety of factors, the most important of which is load fluctuation, i.e., the load applied to the object being moved. In the case of a print head load fluctuation is caused by the printing operation. Other factors such as friction, motor characteristics, etc. also have an effect on the instantaneous velocity of the stepping motor shaft, even though the average velocity remains constant. Obviously, if the instantaneous velocity is not constant or substantially constant related functions are not exactly repeatable and may not occur at the precise point that they should occur. For example, in order for a dot matrix serial printer to produce images as clear as desired, each dot column must be printed at precise point. If not, the image lacks clarity to the extent one or more dot columns is skewed, i.e., misplaced.

The foregoing difficulty becomes particularly acute when the serial printer prints bi-directionally as opposed to unidirectionally. In such an environment, a character may be skewed in one direction in one line and another, adjacent, character skewed in the other direction in the next line, resulting in an unacceptable print.

Therefore, it is an object of this invention to provide a new and improved stepping motor control system.

It is a further object of this invention to provide a closed loop stepping motor control system for controlling the rotational velocity of a stepping motor such that the instantaneous velocity remains substantially constant.

It is another object of this invention to provide a stepping motor control system having substantially less over and under shoot about an average velocity than a system wherein a constant frequency source is used to control the operation of a stepping motor.

It is a still further object of this invention to provide a closed loop control system for controlling the rotational velocity of a stepping motor in either direction during periods of continuous shaft rotation.

SUMMARY OF THE INVENTION

In accordance with principles of this invention, a closed loop control system for controlling the rotational velocity of a stepping motor so as to maintain shaft velocity constant, during periods of continuous shaft rotation, is provided. An electronic control subsystem senses the rotation of the shaft of the stepping motor and produces step response signals. The step response signals are developed into a series of narrow pulses, each of which is related to the occurrence of an incremental step of movement of the shaft of the stepping motor. The narrow pulses are used to control the counting of clock pulses by a counter such that inter-step time ($T_t$) data is produced. The $T_t$ data is gated to a controller adapted to function in accordance with the equation $[2D_{t-1} + (T_{nom} - T_t)]/2$, to produce step delay control ($D_t$) data, where $D_{t-1}$ data is the previous step delay control data and $T_{nom}$ data is predetermined nominal inter-step time data. The $D_t$ data thusly developed is used to control the production of the next motor stepping control signal and becomes, for the next calculation, $D_{t-1}$.

In accordance with further principles of this invention, a bidirectional control system is provided. In the bidirectional control system separate $D_t$ data is developed and stored for both clockwise and counter-clockwise rotation of the stepping motor shaft.

In the preferred form of the invention, the step response narrow pulses are produced by a subsystem that includes a position sensor adapted to sense step movements of the shaft of the stepping motor. The position sensor output is conditioned and shaped into a squre wave signal formed such that each edge of the square wave signal represents a step increment of movement of the shaft of the stepping motor. The frequency of the square wave signal is doubled by a frequency doubler. The output of the frequency doubler is a series of narrow pulses, with one pulse occurring for each step increment of movement of the shaft of the stepping motor. The output of the frequency doubler is applied to a differentiator and to a zero crossing occurrence latch. The output of the differentiator is used to control a clock pulse counter such that a count is made between each set of adjacent narrow pulses. These counts, thus, represent the elapsed time occurring between step movement sensing and form the $T_t$ data. The zero crossing occurrence latch controls the gating of the $T_t$ data to the controller, which functions in accordance with the foregoing equation. The $D_t$ data formed at the output of the controller is applied to a timing latch, and when enabled, the output of the timing latch presets a motor control counter. After being enabled, the motor control counter counts up (or down) from its preset count to a predetermined count, at which time a motor step control pulse is produced. Thus, the $D_t$ data developed controls the time between (e.g. delay) the completion of a shaft step and the occurrence of the next motor step control pulse. The value of $D_t$ is such that when $T_t$ is made equal to $T_{nom}$, the instantaneous as well as the average velocity of the stepping motor shaft is maintained constant. While a slight amount of over and/or undershoot velocity variations may occur, the magnitude of such variations is substantially less than those occurring when a constant frequency source is connected to a particular stepping motor.

It will be appreciated from the foregoing brief summary that the invention provides a system that measures the elapsed time between the sensing of motor step occurrences and utilizes this information to control the timing of the production of step control pulses adapted to cause the stepping motor shaft to rotate. While $D_t$ may be different for each of the two directions of shaft rotation when the invention is implemented in bi-directional form the actual instantaneous velocity of rotation will be substantially constant in both directions.

In the preferred form of the invention, the controller is formed by a microprocessor (or portion thereof). A suitable microprocessor may include an internal controller, and accumulators and registers, as necessary to execute a sequence of steps (algorithm) adapted to perform the foregoing equation. As an alternative, a "hard wired" system adapted to perform the same or a similar series of steps may be utilized.

As will be readily appreciated by those skilled in the stepping motor control art, the invention not only provides accurate velocity control, it automatically compensates for wear and other changes that can effect motor velocity. This benefit is achieved because the $D_t$ data is continuously recomputed.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Figure 1:
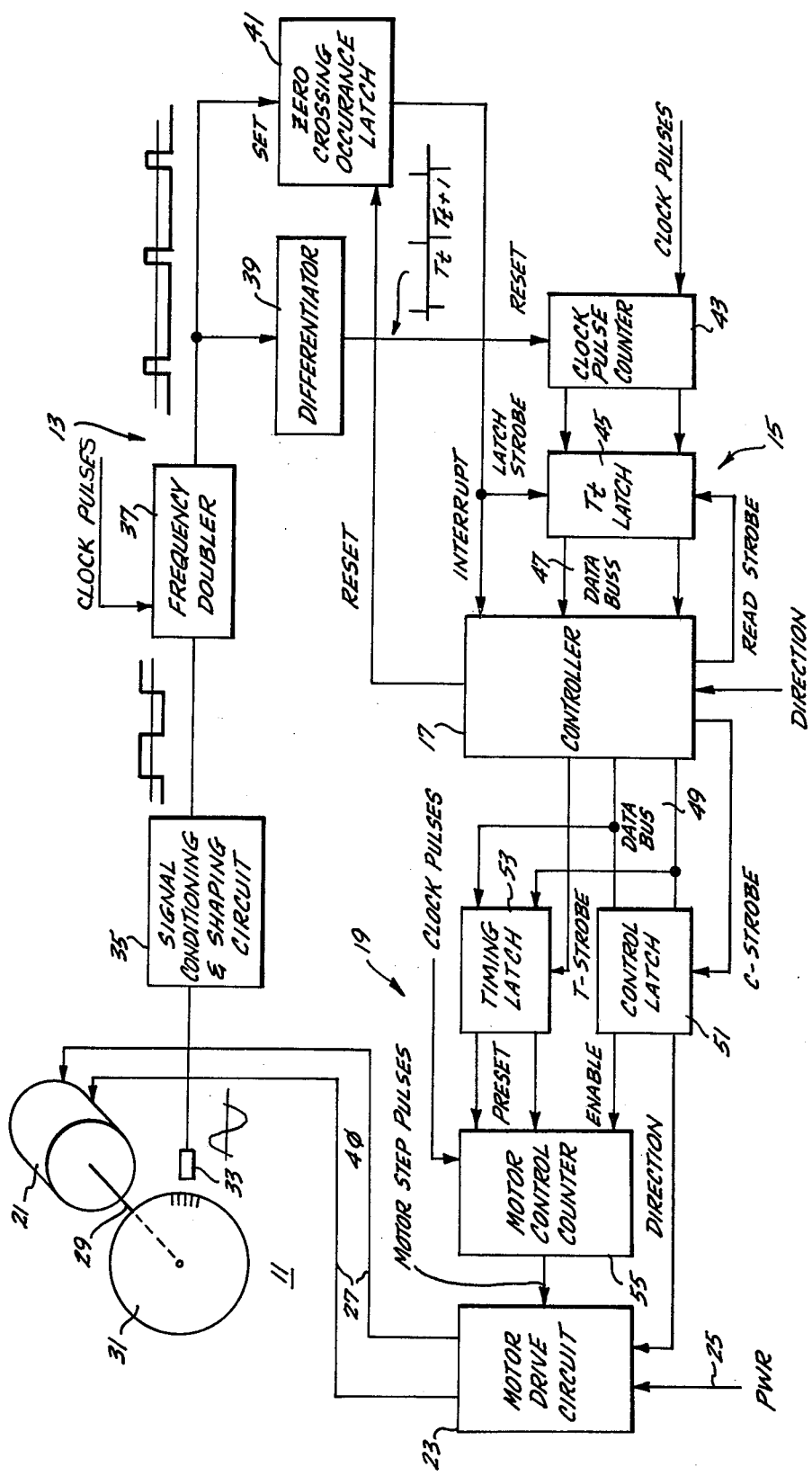
FIG. 1 is a partially pictorial and partially block diagram illustrating a preferred embodiment of a stepping motor closed loop constant velocity control system formed in accordance with the invention.

FIG. 1 illustrates a preferred embodiment of a stepping motor closed loop constant velocity control system formed in accordance with the invention and comprises: a stepping motor system 11; a step response control signal producing subsystem 13; a clock pulse counting subsystem 15; a controller 17; and, an output subsystem 19. The step response control signal producing subsystem 13 and the clock pulse counting subsystem 15 form an elapsed time interval counter adapted to produce data related to the time during which the shaft of a stepping motor moves through a predetermined increment.

The stepping motor system 11 comprises: a stepping motor 21; and, a motor drive circuit 23. The motor drive circuit 23 has a power input 25 whereat DC power at some predetermined voltage level, such as 8 or 18 volts is applied. When enabled by a step pulse, the motor drive circuit converts the input power into suitable four phase ($4\phi$) power, which is applied via connecting wires 27 to the inputs of the stepping motor 21.

The step response control signal producing subsystem comprises: a position wheel 31 mounted on the shaft 29 of the stepping motor 21; a position sensor 33 mounted adjacent to the position wheel so as to sense the rotation of the position wheel; a signal conditioning and shaping circuit 35 connected to the output of the position sensor 33; a frequency doubler 37 connected to the output of the signal conditioning and shaping circuit 35; a differentiator 39 connected to the output of the frequency doubler 37; and, a zero crossing occurrence latch 41 having its set input connected to the output of the frequency doubler 37.

As will be recognized by those skilled in the stepping motor art, and others, the position wheel 31 may take on a variety of forms. In one form, it may comprise a disc having a plurality of ferromagnetic "teeth" located about its periphery. Correspondingly, the position sensor would then comprise a magnetic sensor whose output is varied each time a "tooth" passes the sensor. Alternatively, electro-optical, capacitive and other types of coupling arrangements can be utilized, as desired. In normal operation, such position sensors produce output signals that are somewhat sinusoidal in form. The number of sinusoidal waveforms produced from a predetermined "null" or start position define the "steps" through which the shaft of the stepping motor passes and, thus, the position of the shaft of the stepping motor 21. Control is provided by "counting" the number of sinusoids until a desired position is reached.

Figure 3:
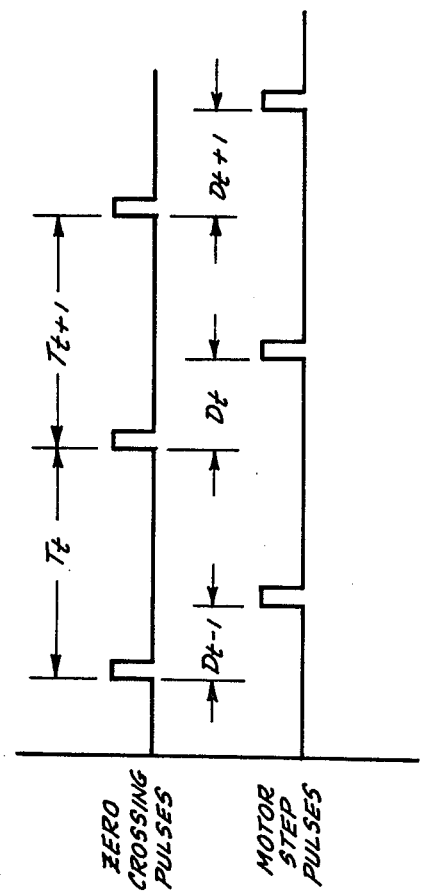
FIG. 3 is a timing diagram illustrating the relationship between zero crossing control signals and motor step signals; and, FIG. 4 is a flow diagram illustrating the implementation of an algorithm suitable for use by the controller of FIG. 1 to cause it to function in accordance with the equation $[2D_{t-1} + (T_{nom} - T_t)]/2 = D_t$.

The invention uses the generally sinusoidal output of the position sensor 33 to provide velocity control. Specifically, the output of the position sensor is conditioned and shaped by the signal conditioning and shaping circuit 35 into a generally square wave signal. Each rise and fall of the square wave defines the occurrence of a step increment of movement of the position wheel 31 and, thus, of the shaft 29 of the stepping motor 21. The frequency doubler 37 produces a series of spaced narrow (e.g. 10 microsecond) pulses at twice the frequency of the square wave signal. Thus, each pulse represents a step movement of the shaft of the stepping motor 21. Obviously, the inter-step time between pulses is related to the rate of movement of the position wheel 31 and, thus, the velocity of the shaft 29 of the stepping motor 21. As illustrated in FIG. 3, the inter-step time between pulses is herein designated $T_t$, $T_{t+1}$.

The differentiator 39 differentiates the output of the frequency doubler 37 in a conventional manner, whereby a positive going spike occurs at the beginning of each pulse of the pulse chain output of the frequency doubler 37 and a negative going spike occurs at the end of each such pulse. Thus, the time between a pair of adjacent positive (or negative) going spikes is equal to the time between pulses, i.e. $T_t$, $T_{t+1}$.

The zero crossing occurrence latch 41 is a single S/R latch formed such that it is set by the rising edge of the pulse output of the frequency doubler 37, which is the zero crossing reference point of the sinusoidal output of the position sensor 33. The zero crossing occurrence latch 41 is reset by the controller 17 in the manner hereinafter described.

The clock pulse counting subsystem 15 comprises a clock pulse counter 43 and a $T_t$ latch 45. Clock pulses generated by a suitable clock source (not shown) are applied to the clock input of the clock pulse counter 43. The clock pulse frequency is synced with the output of the frequency doubler due to the application of synchronizing clock pulses to the frequency doubler.

The output of the differentiator 39 is connected to the reset input of the clock pulse counter 43. The clock pulse counter 43 is formed such that it is reset by the negative going spike outputs of the differentiator 39.

The parallel data outputs of the clock pulse counter 43 are connected to the data inputs of the $T_t$ latch 45. If, for example, the clock pulse counter is an (8) bit counter, the latch 45 is an (8) bit latch. The latch strobe input, i.e., the input that enables the latch to read the output of the clock pulse counter 43, is connected to the output of the zero crossing occurrence latch 41 such that when the zero crossing occurrence latch 41 is set, a latch strobe input is applied to the latch 45 that enables it to read the output of the clock pulse counter 43.

While not specifically illustrated in FIG. 1, the controller 17 includes various functionally discrete subsystems. As will be better understood from the following detailed description of the operation of the controller, these functionally discreet subsystems may include: a memory; an accumulator; two registers; and a sequencer, plus related subsidary items. These subsystems cause the controller to execute a series of steps or an algorithm adapted to perform a calculation in accordance with the equation:

$$D_t = [2D_{t-l} + (T_{nom} - T_t)]/2 \qquad (1)$$

where:

$D_t$ is the delay time necessary to cause the next motor step pulse to occur at the precise point in time necessary to maintain the rotation of the shaft 29 of the stepping motor 21 at a constant velocity;

$T_t$ is the data output of the counter 43 and is equal to the time between the negative going spikes occurring at the output of the differentiator 39 which time, in turn, is related to the time between the pulses occurring on the output of the frequency doubler 37 and, thus, the completion of steps by the stepping motor; and $T_{nom}$ is equal to a predetermined nominal value of $T_t$ and is stored in the memory of the controller 17.

The controller 17 is connected to the output of the zero crossing occurrence latch 41 so as to receive an interrupt signal when the zero crossing occurrence latch 41 is set. This signal causes the controller to perform the algorithm discussed below, and the production of a reset pulse, which is applied to the reset input of the zero crossing latch 41. The controller is also connected to receive the output of the $T_t$ latch 45 via a $T_t$ data bus 47. Further, the controller 17 receives, from a suitable source, a direction control signal designating the direction of rotation of the shaft 29 of the stepping motor 21. If, for example, a digital data source, e.g., magnetic tape, is being used by a system, not shown, to control the position of the stepping motor 21, the portion of that data designating the direction of rotation of the shaft 29 necessary to achieve a desired position provides the direction information applied to the controller. With respect to its outputs, the controller produces a read strobe signal, which is applied to the $T_t$ latch 45. The read strobe signal enables the $T_t$ latch 45 to apply any data it is storing to the $T_t$ data bus 47 for use by the controller 17. The controller outputs also include an output bus 49 and T-strobe and C-strobe conductors, connected to the output circuit 19 in the manner hereinafter described.

Prior to describing the operation of the controller 17 in more detail, the nature of the output subsystem 19 is first described. The output system 19 comprises: a control latch 51; a timing latch 53; and, a motor control counter 55. The output data bus 49 of the controller 17 is connected to the data inputs of both the control latch 51 and the timing latch 53. The T-strobe conductor (which carries timing latch strobe pulses produced by the controller) is connected to the enable input of the timing latch. The C-strobe conductor (which carries control latch strobe pulses also produced by the controller) is connected to the enable input of the control latch. The occurrence of strobe pulses on the T and C-strobe lines causes their respective latches to "read" the data present on the data bus 49 when the respective strobe pulses occur.

The output of the timing latch, designated PRESET, is applied to a presetting input of the motor control counter 55, and presets that counter in accordance with the data then stored in the timing latch 53. The outputs of the control latch 51 are designated DIRECTION and ENABLE. The DIRECTION output is applied to the direction control input of the motor drive circuit 23 and the ENABLE output is applied to the enable input of the motor control counter 55. The output of the motor control counter is a series of motor step pulses, one occurring for each motor step desired.

In operation $D_t$ data developed by the controller in the manner herein described is first applied to the data bus 49 and stored in the timing latch upon the occurrence of a T-strobe pulse. Next data for the control latch is applied to the data bus 49 and strobed in to the control latch by a C-strobe pulse. The control latch then enables the motor control counter to read the "preset data" ($D_t$) stored in the timing latch. Thereafter, the motor control counter counts clock pulses (up or down) until a predetermined value is reached, at which point a motor step pulse is produced. The stepping motor is then stepped in the direction determined by the DIRECTION output of the control latch, and the sequence repeats. That is, the position sensor senses step movement, new $D_t$ data ($D_{t+l}$) is developed and another motor step pulse produced. This action continues until a suitable subsystem (not shown) determines that the stepping motor has stepped to the extent desired. Thereafter the apparatus of the invention is inhibited.

Figure 4:
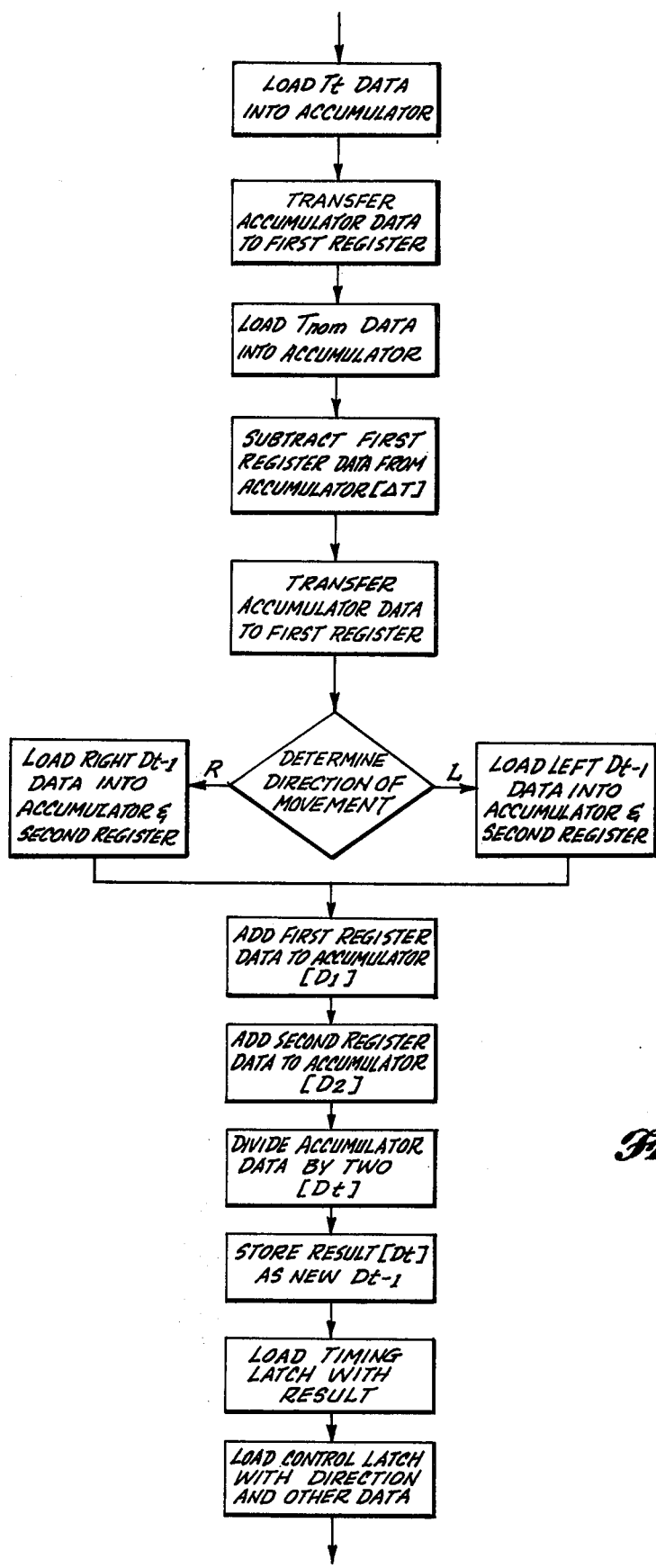

Turning now to a more complete description of the operation of the controller, the controller can perform the sequence of steps (algorithm) necessary to perform the calculation denoted above in a variety of different manners. One preferred form of a sequence, comprising four steps, is set forth below:

Step 1; $T_{nom} - T_t = \Delta T$
Step 2; $D_{t-1} + \Delta T = D_1$
Step 3; $D_1 + D_{t-1} = D_2$
Step 4; $D_2/2 = D_t$ As noted above, the controller 17 may be implemented in the form of a microprocessor (or portion thereof). It could also be "hard wired" or implemented in the form of a mini-computer. Regardless of how implemented, the controller performs a sequence of steps (such as the algorithm set forth above) necessary to carry out a calculation in accordance with equation (1) set forth above. FIG. 4 is a flow diagram generally illustrating the specific functions to be performed by a microcomputer designed to function in accordance with the algorithm noted above.

When the controller 17 receives an interrupt signal, (which occurs when the zero crossing latch 41 is set as discussed above), it produces a read strobe signal whereby the data output of the clock pulse counter 43 ($T_t$ data) is loaded into the controller, preferably into an accumulator. Thereafter, the accumulator data is transferred to a first register. The $T_{nom}$ (which is stored in a memory) is loaded into the accumulator. Next, the data stored in the first register is subtracted from the data stored in the accumulator, whereby $\Delta T$ data is developed. The $\Delta T$ data is then transferred to the first register. Next, the controller determines the direction of movement of the shaft 29 of the stepping motor 21. Assuming the shaft is connected to a carriage on which a print head is mounted, the movement may be to the left or the right, depending upon whether the shaft is to be rotated in a clockwise or counterclockwise direction. If to the right, $D_{t-1}$ data related to right hand movement is loaded into the accumulator and a second register. If to the left, $D_{t-1}$ data related to left hand movement is loaded into the accumulator and the second register. ($D_{t-1}$ data is the $D_t$ data developed during the immediately preceding calculation in the same direction.) Regardless of whether the $D_{t-1}$ data is right or left, the first register data is added to it in the accumulator and $D_1$ data is formed. Next, the data in the second register is added to the accumulator and $D_2$ data is formed. Then the data in the accumulator is divided by two (2) whereby $D_t$ data is formed. The $D_t$ data is stored as new $D_{t-1}$ data (either right or left depending upon the determined direction of movement). In addition, the $D_t$ data is loaded into timing latch 53. Thereafter, direction control and enabling data are loaded into the control latch 51 as noted above. Then, also as discussed above, the output of the timing latch presets the motor control counter 53 and the control latch enables that counter. Further, the control latch supplies directional information to the motor drive circuit 23.

It will be appreciated from the foregoing description that the invention provides a closed loop control system for controlling the rotational velocity of a stepping motor during a period of continuous shaft rotation such that the instantaneous velocity remains substantially constant. That is while there may be some slight variations in velocity, the variations are substantially less than occur when a constant frequency source is applied to a stepping motor with a varying load. In a dot matrix printer environment the end result is less character skew and more readable printing.

Figure 2:
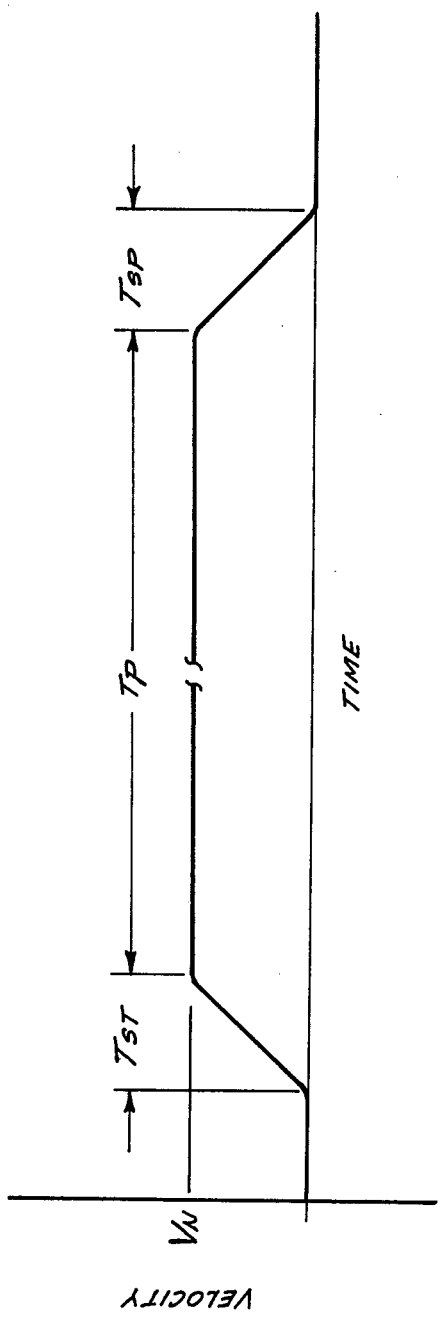
FIG. 2 is a velocity/time graph illustrating the constant velocity of the shaft of a stepping motor controlled by a closed loop stepping motor control system formed in accordance with the invention.

As illustrated in FIG. 2, during a preliminary step period, designated $T_{sp}$, the velocity of movement of a printer carriage driven by a stepping motor controlled in accordance with the invention rapidly accelerates to a desired speed $V_N$. Rapid acceleration may, for example, cover four steps. Preferably, the first steps are not controlled by the invention. However, the latter steps are controlled so that a smooth transition occurs when $V_N$ is reached. Thereafter, during a movement period of time, designated $T_p$ (for printing), $V_N$ remains substantially instantaneously constant. At the end of the motor stepping action, the invention is again disabled during a period designated $T_{sp}$ during which shaft rotation decelerates to zero.

As noted, enabling the invention during the two-step period immediately preceding achieving a rotational velocity of $V_N$ results in a smooth transition in the region where $T_{st}$ meets $T_p$. The smoothness is enhanced because the last two steps of the start ramp ($T_{st}$) are delayed from the zero crossing determined by the position sensor output by the delay $D_t$ developed during a prior seuqence of operation. This technique is substantially better than a technique using a fixed ramp constant because such a constant ignores factors such as (1) direction; (2) motor type; (3) motor parameters; and, (4) other variables affecting acceleration and velocity. Contrawise, the last delay (in the desired direction of rotation) automatically takes into account these factors. In other words, the closed loop calculated delay ($D_t$) more closely optimizes the exact environmental situation and, thereby, enhances transition smoothness. In this regard it should be noted that an initial assumed value of $D_t$ is used when the invention is first implemented, e.g., when a printer using the invention is first energized. Thereafter, the intializing $D_t$ is replaced by the calculated value of $D_t$. If, for example, $T_{nom}$ is 2.08 microseconds, the initializing $D_t$ may be a data value equal to 1.04 microseconds.

In addition to the invention being useful with stepping motors having varying characteristics, it will also be appreciated that the invention automatically compensates for variations in stepping motor and related mechanical system characteristics occurring over the lifetime of operation of a device using the invention, e.g., a printer. As wear and other factors vary these characteristics, the $D_t$ value is automatically varied in a compensating manner, whereby the desired constant velocity is maintained. Thus, maintenance adjustments are generally avoided using the invention.

While a preferred embodiment of the invention has been illustrated and described, it will be appreciated by those skilled in the art and others that various changes can be made therein without departing from the spirit and scope of the invention. For example, the steps of the algorithm noted above can be varied either in sequence or nature. However, in a serial printer application, the inclusion of $D_{t-1}$ twice, and its subsequent division by two (2), is significant in that such an inclusion prevents large changes in $D_t$, with respect to $D_{t-1}$, causing the motor to oscillate about a nominal velocity. The two steps of the algorithm involving this inclusion result in an undercompensation correction whereby transient over response is reduced, and a smoother transition from a non-normal velocity to the desired velocity occurs. Further, while the motor step pulses in the herein described preferred embodiment essentially occur essentially exactly between the pulse outputs of the frequency doubler (as a result of $D_{t-1}$ being included twice in the algorithm and subsequently divided by two), other factorial relationships can be utilized, if desired, i.e., the equation can be changed. In general, however, such equations will be more complicated than the equation illustrated and described above, and, thus, not as preferred. Basically, the equation must be such that $T_t$ must be made equal to $T_{nom}$, at which point the delay remains constant, but available to be changed if $T_t$ becomes unequal to $T_{nom}$. Further, other types of counting and gating systems for developing the $T_t$ data related to the time between steps of the stepping motor can be utilized, if desired. Moreover, while, as noted above, the invention has been developed for use in combination with a dot matrix type serial printer and has generally been described in such environment, it will be readily appreciated that the invention is also useful in other environments. Hence, the invention can be practiced otherwise than is specifically described herein.

The embodiments of the invention in which an exclusive property or privilege is claimed are defined as follows:

1. A stepping motor closed loop constant velocity control system comprising:
   (A) a time measuring means, suitable for connection to a stepping motor, for producing measured time data ($T_t$) related to the elapsed time occurring between step increments of movement of the shaft of said stepping motor;
   (B) a controller including a memory for storing nominal time data ($T_{nom}$) and time delay data ($D_{t-1}$) produced as a result of an immediately preceding step increment of movement of said shaft, said controller connected to said time measuring means for receiving said measured time data ($T_t$), said controller suitable for developing new time delay data ($D_t$) for each step increment of movement of said shaft of said stepping motor by:
      (1) comparing said measured time data ($T_t$) with said nominal time data ($T_{nom}$) so as to obtain velocity error data;
      (2) summing the time delay data ($D_{t-1}$) produced as a result of an immediately preceding step increment of movement of said shaft with said velocity error data to produce new time delay data ($D_t$); and,
      (3) storing said new time delay data for subsequent use as the time delay data of an immediately preceding step increment of movement of said shaft; and,
   (C) an output subsystem connected to said controller to receive said new time delay data and, in accordance therewith, develop a delay motor step pulse suitable for application to a motor drive circuit adapted to drive said stepping motor.

2. A stepping motor closed loop constant velocity control system as claimed in claim 1 wherein said time measuring means comprises:
   a step control signal producing subsystem for sensing the rotation of the shaft of a stepping motor and producing control signals related to step increments of movement that occur as the shaft of said stepping motor rotates; and,
   a time measuring subsystem, connected to said step control signal producing subsystem, for receiving selected ones of said control signals and producing said measured time data related to the elapsed time occurring between step increments of movement of the shaft of said stepping motor.

3. A stepping motor closed loop constant velocity control system as claimed in claim 2 wherein said controller functions in accordance with the following equation to produce said new time delay:

$$[2D_{t-1} + (T_{nom} - T_t)]/2$$

where; $D_{t-1}$ is said time delay data produced as a result of an immediately preceding step increment of movement of said shaft;

$T_{nom}$ is said nominal time data; and, $T_t$ is said measured time data produced by said time measuring subsystem.

4. A stepping motor closed loop constant velocity control system as claimed in claim 3 wherein said step control signal producing subsystem includes:
   sensing means coupled to the shaft of said stepping motor for producing an output having a parameter related to the rotation of said shaft through predetermined step increments; and
   circuit means connected to said sensing means for producing a pulse chain, one of said pulses of said pulse train occurring each time said shaft moves through one of said predetermined step increments.

5. A stepping motor closed loop constant velocity control system as claimed in claim 4 wherein said circuit means includes:
   a signal conditioning and shaping circuit connected to said sensing means for conditioning and shaping the output of said sensing means to a square wave formed such that each rise and fall of the square wave is related to the movement of said shaft through one of said predetermined step increments; and,
   a frequency doubler connected to the output of said signal conditioning and shaping circuit for producing said pulse chain.

6. A stepping motor closed loop constant velocity control system as claimed in claim 5 wherein said time measuring subsystem includes:
   a clock pulse counter connected to receive clock pulses, and connected to said frequency doubler such that said pulse chain controls the counting of clock pulses by said clock pulse counter; and,
   a $T_t$ latch connected to the output of said clock pulse counter for storing the output of said clock pulse counter, said output forming said measured time data, said $T_t$ latch also being connected to said frequency doubler such that said pulse chain controls the enabling of said $T_t$ latch to receive and store the output of said clock pulse counter.

7. A stepping motor closed loop constant velocity control system as claimed in claim 6 including:
   a differentiator connected between the output of said frequency doubler and the reset input of said clock pulse counter; and,
   a zero crossing occurrence latch having its set input connected to the output of said frequency doubler so as to be set by said pulse chain pulses and its output connected to the enabling input of said $T_t$ latch such that said $T_t$ latch is enabled when said zero crossing occurrence latch is set.

8. A stepping motor closed loop constant velocity control system as claimed in claim 7 wherein said controller is connected to the output of said zero crossing occurrence latch such that when said zero crossing occurrence latch is set, said controller is enabled to function in accordance with said equation.

9. A stepping motor closed loop constant velocity control system as claimed in claim 8 wherein said output subsystem includes:
   a timing latch connected to said controller to receive said $D_t$ data; and,
   a motor control counter connected to the output of said timing latch so as to be set to a preset state by the output of said timing latch, said motor control counter also connected to a clock pulse source for counting from said preset state to a predetermined value, said motor control counter producing a step pulse suitable for application to a motor drive circuit to cause a motor stepping action, when said predetermined value is reached.

10. A stepping motor closed loop constant velocity control system as claimed in claim 9 wherein said sensing means comprises a disc suitable for mounting on the shaft of a stepping motor and a sensor head connected adjacent ot said disc, said sensor head adapted to sense the rotation of said disc and produce a related, generally sinusoidal, output.

11. A stepping motor closed loop constant velocity control system as claimed in claim 1 wherein said controller functions in accordance with the following equation to produce said new time delay data:

$$[2D_{t-1} + (T_{nom} - T_t)]/2$$

where; $D_{t-1}$ is said time delay data produced as a result of an immediately preceding step increment of movement of said shaft;
$T_{nom}$ is said nominal time data; and,
$T_t$ is said measured time data produced by said time measuring means.

12. A stepping motor closed loop constant velocity control system comprising:
(A) a time measuring means, suitable for connection to a stepping motor, for producing measured time data ($T_t$) related to the elapsed time occurring between step increments of movement of the shaft of said stepping motor
(B) a controller including a memory for storing nominal time data ($T_{nom}$) and time delay data ($D_{t-1}$) produced as a result of an immediately preceding step increment of movement of said shaft, said controller connected to said time measuring means for receiving said measured time data ($T_t$), said controller suitable for developing new time delay data ($D_t$) for each step increment of movement of said shaft of said stepping motor in accordance with the equation $D_t = [2D_{t-1} + (T_{nom} - T_t)]/2$; and,
(C) an output subsystem connected to said controller to receive said new time delay data and, in accordance therewith, produce a delay motor step pulse suitable for application to a motor drive circuit adapted to drive said stepping motor.

* * * * *